United States Patent
Ivory et al.

(10) Patent No.: US 9,918,228 B2
(45) Date of Patent: *Mar. 13, 2018

(54) SESSION COMPLETION THROUGH CO-BROWSING

(71) Applicant: International Business Machines Corporation, Armonk, NY (US)

(72) Inventors: Andrew J. Ivory, Wake Forest, NC (US); Todd E. Kaplinger, Raleigh, NC (US); Barry J. Pellas, Durham, NC (US); Matthew T. Pellas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,952

(22) Filed: Apr. 24, 2017

(65) Prior Publication Data

US 2017/0230828 A1    Aug. 10, 2017

Related U.S. Application Data

(63) Continuation of application No. 14/808,492, filed on Jul. 24, 2015, now Pat. No. 9,646,098, which is a
(Continued)

(51) Int. Cl.
*H04L 29/06* (2006.01)
*H04W 12/06* (2009.01)
(Continued)

(52) U.S. Cl.
CPC ...... *H04W 12/06* (2013.01); *G06F 17/30873* (2013.01); *H04L 9/0894* (2013.01);
(Continued)

(58) Field of Classification Search
CPC . H04L 9/32; H04L 29/08621; H04L 29/0872; H04L 29/06047

See application file for complete search history.

(56) References Cited

U.S. PATENT DOCUMENTS

| | | | |
|---|---|---|---|
| 7,043,455 B1* | 5/2006 | Cuomo | G06Q 20/3674 705/50 |
| 7,277,408 B2 | 10/2007 | Sorsa | |
| 7,660,899 B2 | 2/2010 | Gavrilescu | |
| 2002/0078154 A1 | 6/2002 | Djennane | |
| 2003/0154289 A1 | 8/2003 | Williamson | |
| 2003/0195963 A1 | 10/2003 | Song et al. | |
| 2005/0086344 A1 | 4/2005 | Suesserman | |
| 2007/0233880 A1 | 10/2007 | Nieh et al. | |
| 2009/0260055 A1 | 10/2009 | Parmar | |
| 2010/0082747 A1 | 4/2010 | Yue et al. | |
| 2010/0185951 A1 | 7/2010 | Nichols | |

(Continued)

OTHER PUBLICATIONS

Wiltse, "PlayByPlay: Collaborative Web Browsing for Desktop and Mobile Devices CHI 2009—Social Search and Sensemaking", Apr. 8, 2009—Boston, MA, USA.

*Primary Examiner* — Hadi Armouche
*Assistant Examiner* — Hee Song
(74) *Attorney, Agent, or Firm* — Steven M. Greenberg, Esq.; CRGO Law

(57) ABSTRACT

A method, system and computer program product for session completion through co-browsing is claimed. The method can include establishing a content browsing session between a first computing device and a content server serving access to content to the first computing device and maintaining state data for the content browsing session. A co-browsing arrangement of the content can be created as between the first computing device and a second computing device and at least a subset of the state data can be cloned for use by the second computing device during co-browsing of the content. Thereafter, a modified form of the subset of the state data can be received from the second computing device resulting from the co-browsing of the content by the second computing device and the modified form of the subset of the state data can be provided to the first computing device for use during the content browsing session.

9 Claims, 2 Drawing Sheets

Related U.S. Application Data continuation of application No. 13/326,265, filed on Dec. 14, 2011, now Pat. No. 9,098,592.

(51) Int. Cl.
  *G06F 17/30* (2006.01)
  *H04L 9/08* (2006.01)
  *H04W 12/04* (2009.01)
  *H04L 29/08* (2006.01)

(52) U.S. Cl.
  CPC .......... *H04L 63/0428* (2013.01); *H04L 63/06* (2013.01); *H04L 63/083* (2013.01); *H04L 67/02* (2013.01); *H04L 67/1097* (2013.01); *H04L 67/141* (2013.01); *H04L 67/142* (2013.01); *H04W 12/04* (2013.01)

(56) References Cited

U.S. PATENT DOCUMENTS

| | | |
|---|---|---|
| 2010/0306642 A1 | 12/2010 | Lowet et al. |
| 2011/0296038 A1* | 12/2011 | Mandre ............. G06F 17/30899 709/228 |
| 2012/0166518 A1 | 6/2012 | Alev et al. |
| 2012/0331406 A1* | 12/2012 | Baird ................ G06F 17/30861 715/760 |
| 2013/0041790 A1 | 2/2013 | Murugesan |

* cited by examiner

SESSION COMPLETION THROUGH CO-BROWSING

CROSS-REFERENCE TO RELATED APPLICATION

This application is a Continuation of U.S. application Ser. No. 14/808,492, filed Jul. 24, 2015, which is a Continuation of U.S. application Ser. No. 13/326,265, filed Dec. 14, 2011, the entirety of each which is incorporated herein by reference.

BACKGROUND OF THE INVENTION

Field of the Invention

The present invention relates to the field of content browsing and more particularly to session completion during content browsing.

Description of the Related Art

Content browsing refers to the retrieval and presentation of electronic content in a browser client. Content generally can include electronic documents, audio, audiovisual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material.

Hypertext Transfer Protocol (HTTP) is the protocol by which much of content browsing occurs in the World Wide Web ("Web"). HTTP is stateless in that a client computer running a Web browser must establish a new Transmission Control Protocol (TCP) network connection to the Web server with each new HTTP GET or POST request. The Web server, therefore, cannot rely on an established TCP network connection for longer than a single HTTP GET or POST operation. As such, session management is a technique used to make the stateless HTTP protocol support session state. In session management, session information is stored on the Web server using a session identifier (session ID) generated as a result of the first request from an end user through a corresponding Web browser.

Content browsing in a session often can become such that a completion of the session becomes inhibited. Typically, a session can become inhibited due to the limitations of computing resources at hand, for instance available network bandwidth or processing power, or even the functionality of the content browser itself. In this regard, content browsing in a pervasive device such as a smart phone can become inhibited due to limited connectivity, or the limited functionality of the embedded content browser of the pervasive device. In the case where a content browsing session becomes inhibited, oftentimes the only choice of the end user is to terminate the session and begin anew from a different computing device. To the extent the content browsing session involved a complex set of interactions such as setting forth travel reservations or completing a lengthy application, restarting an inhibited content browsing session can be frustrating to say the least.

BRIEF SUMMARY OF THE INVENTION

Embodiments of the present invention address deficiencies of the art in respect to session management during content browsing and provide a novel and non-obvious method, system and computer program product for session completion through co-browsing. In an embodiment of the invention, a method of session completion through co-browsing can include establishing a content browsing session between a first computing device and a content server serving access to content to the first computing device and maintaining state data for the content browsing session. A co-browsing arrangement of the content can be created as between the first computing device and a second computing device and at least a subset of the state data can be cloned for use by the second computing device during co-browsing of the content. Thereafter, a modified form of the subset of the state data can be received from the second computing device resulting from the co-browsing of the content by the second computing device and the modified form of the subset of the state data can be provided to the first computing device for use during the content browsing session.

In another embodiment of the invention, a content browsing data processing system can be provided. The system can include a host server with at least one processor and memory and configured for communicative coupling to different computing devices over a computer communications network and a content server executing in the memory of the host server. The system also can include co-browsing management logic coupled to the content server and a session completion module coupled to the co-browsing management logic. The module in turn can include program code enabled upon execution in the memory of the host server to direct establishment of a co-browsing arrangement of content accessed by a first computing device in a content browsing session of the content, as between the first computing device and a second computing device, to clone at least a subset of state data created during the content browsing session for use by the second computing device during co-browsing of the content, to receive a modified form of the subset of the state data from the second computing device resulting from the co-browsing of the content by the second computing device, and to provide the modified form of the subset of the state data to the first computing device for use during the content browsing session.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for session completion through co-browsing. In an embodiment of the invention, a first content browsing session can be established as between a content server and a first computing device and session state data can be created and managed for the first content browsing session. Subsequently, a second content browsing session can be established between the content server and a second computing device and the second content browsing session can be coupled to the first content browsing session through a co-browsing arrangement. During co-browsing, the session state data for the first content browsing session can be copied into the second content browsing session and the session state data can be further modified according to actions occurring in the second content browsing session through the second computing device. Finally, the modified session state data can be copied back to the first content browsing session. In this way, inhibitions encountered during the content browsing session with the first computing device can be overcome through the use of the second computing device in the co-browsing session.

Figure 1:
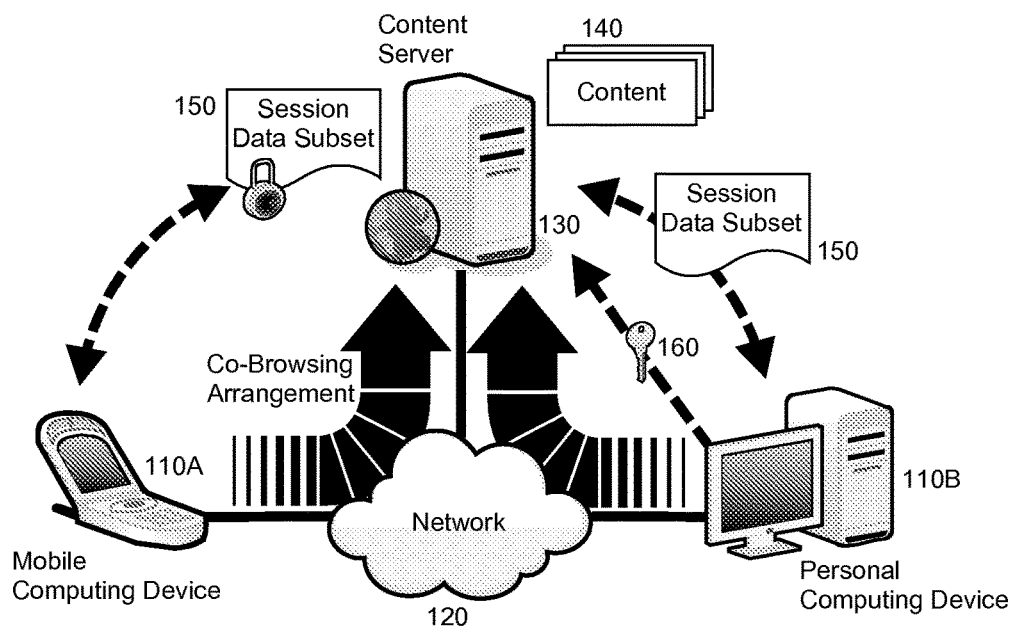
FIG. 1 is a pictorial illustration of a process for session completion through co-browsing.

In further illustration, FIG. 1 pictorially shows a process for session completion through co-browsing. As shown in FIG. 1, a first computing device 110A such as a mobile computing device can access content 140 provided by content server 130 over a computer communications network 120. While accessing the content 140, a subset of session data 150 can be collected and secured in content server 130. Subsequently, a second computing device 110B can be invited to engage in a co-browsing session of the content 140 with the first computing device 110A.

Using authentication data 160 provided to the second computing device 110B, the subset of the session data 150 can be provided for use in connection with the accessing of the content 140 by the second computing device 110B. In the course of accessing the content 140, the subset of the session data 150 can be further modified and ultimately provided to the content server 130 for use by the first computing device 110A when accessing the content 140 in order for the first computing device 110A to complete the process of accessing the content 140. Consequently, the second computing device 110B can be used in a co-browsing arrangement to facilitate the accessing of the content 140 during a period of time when such access by the first computing device 110A becomes inhibited.

Figure 2:
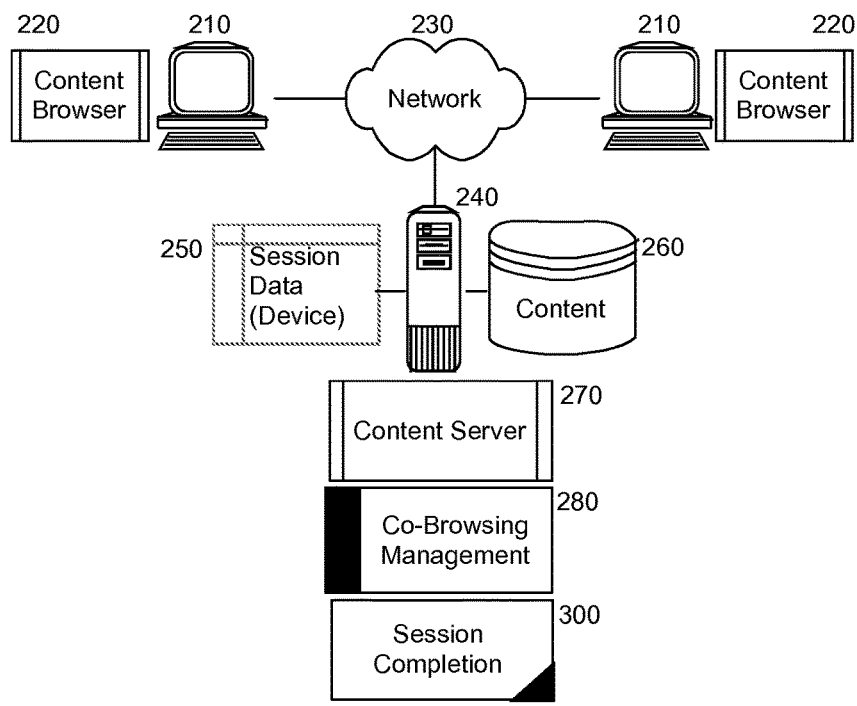
FIG. 2 is a schematic illustration of a content browsing data processing system configured for session completion through co-browsing; and, FIG. 3 is a sequencing diagram illustrating a process for session completion through co-browsing.

The process described in connection with FIG. 1 can be implemented in a content browsing data processing system. In yet further illustration, FIG. 2 schematically shows a content browsing data processing system configured for session completion through co-browsing. The system can include a host server 240 with at least one processor and memory configured for communicative coupling over computer communications network 230 to different computing devices 210, each supporting the operation of a content browser 220.

The host server 240 can support the execution of a content server 270 managing access to content 260, for example in the form of a Web application. Further, the content server 270 can maintain a session data store 250 in which session data for different content browsing sessions of the content 260 by different ones of the computing devices 210 can be stored. Co-browsing management logic 280 can be coupled to the content server 270. The co-browsing management logic 280 can be configured to create and maintain co-browsing of the content 260 by the different computing devices 210 through respective content browsers 220 such that interactions with the content 260 can be directed by both content browsers 220 concurrently and viewed through both content browsers 220 concurrently.

Of note, a session completion module 300 can be coupled to the co-browsing management logic 280. The module 300 can include program code that when executed in the memory of the host server 240 can be enabled to direct the co-browsing management logic 280 to initiate a co-browsing session of the content 260 as between the computing devices 210, to clone session data in the session data store 250 for a content browsing session of the content 260 for one of the different computing devices 210 into a content browsing session of the content 260 for the other of the different computing devices 210 and to subsequently clone back the session data as modified by the other of the different computing devices 210 during co-browsing of the content 260 to the one of the different computing devices 210.

Figure 3:
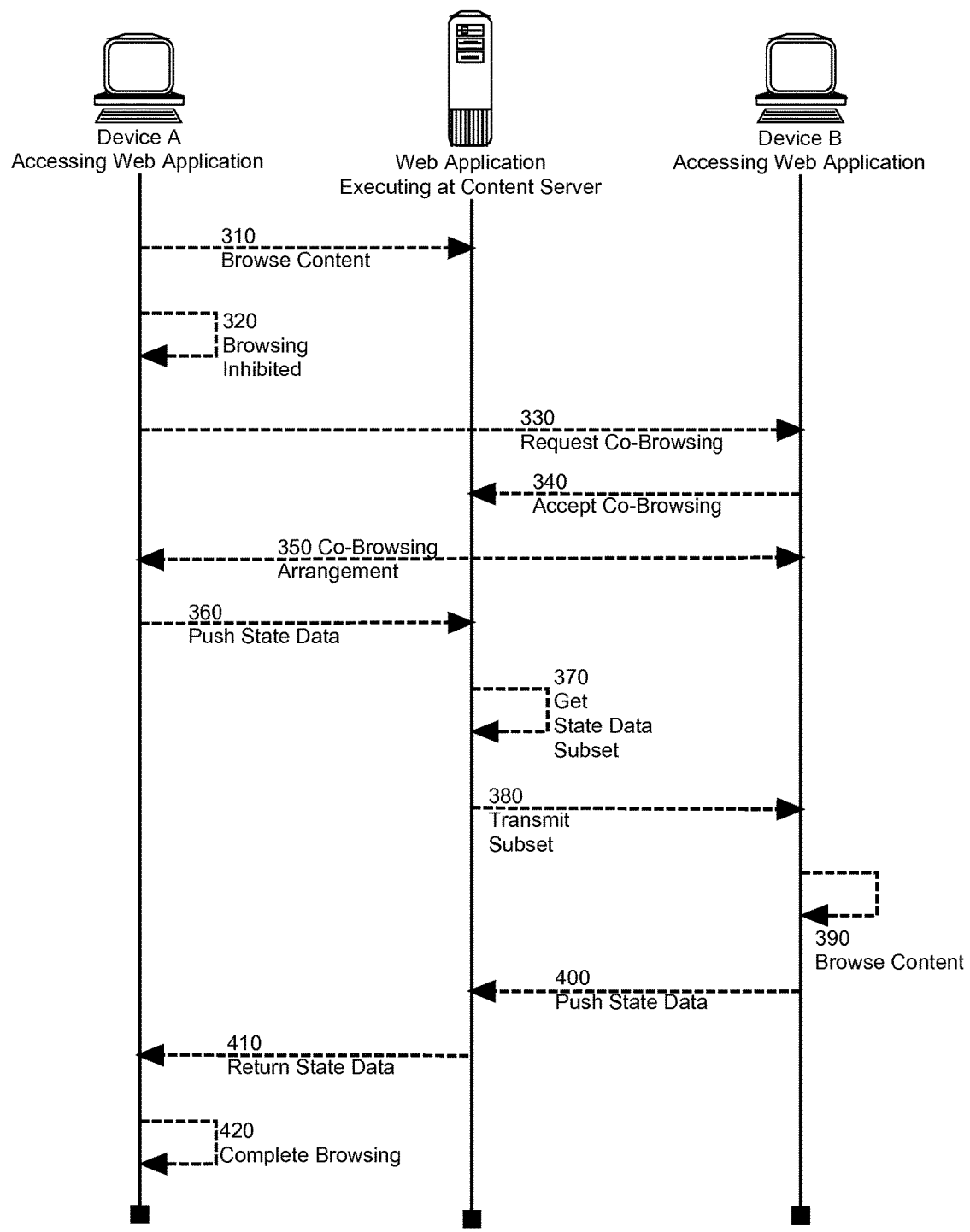

In even yet further illustration of the operation of the session completion module 300, FIG. 3 is a sequence diagram illustrating a process for session completion through co-browsing. Beginning in step 310, a first device can access and interact with content provided by a content server. At step 320, the interaction with the content can become inhibited, for instance in consequence of limited communications bandwidth available to the first device, limited processing resources available to the first device, or limited display capabilities provided by the first device. At step 330, a co-browsing session can be requested by the first device of a second device for accessing the content in a co-browsing arrangement. In response to the request, at step 340 the request can be accepted and at step 350 co-browsing of the content can commence.

At step 360, session data generated as between the first device and the content can be directed for cloning to the second device. In step 370 a subset of the state data, for instance state data flagged as cloneable by the content itself, can be directed for cloning to the second device. In step 380, the subset of the state data can be provided to the second device and in step 390, the content can be accessed by the second device and the subset of the state data further modified in consequence of the accessing of the content by the second device. Thereafter, in step 400 the modified state data can be returned to the content server which in turn can clone the modified state data for use by the first device in step 410. Finally, in step 420 accessing of the content can complete through the first device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of session completion through co-browsing comprising:
   establishing a content browsing session between a first computing device of a user and a content server serving access to content to the first computing device;
   maintaining state data for the content browsing session by the content server;
   flagging ones of the state data as being clonable;
   creating a concurrent co-browsing arrangement of the content as between the first computing device and a second computing device of the user in response to a request by the first computing device when interaction of the first computing device with the content becomes involuntarily inhibited;
   cloning at least a subset of the state data comprising only state data flagged as being clonable for use by the second computing device during co-browsing of the content by storing the subset of the state data in the content server in connection with a key, providing the key to the second computing device during the co-browsing session and granting access to the subset of the state data in response to the second computing device providing the key to the content server;
   receiving a modified form of the subset of the state data from the second computing device resulting from the co-browsing of the content by the second computing device; and,
   providing the modified form of the subset of the state data to the first computing device for use during the content browsing session.

2. The method of claim 1, wherein the first computing device is a mobile computing device and the second computing device is a personal computer.

3. The method of claim 1, wherein the content is provided by a Web application executing in the content server.

4. A content browsing data processing system comprising:
   a host server with at least one processor and memory and configured for communicative coupling to different computing devices over a computer communications network;
   a content server executing in the memory of the host server;
   co-browsing management logic coupled to the content server; and,
   a session completion module coupled to the co-browsing management logic, the module comprising program code enabled upon execution in the memory of the host server to direct establishment of a concurrent co-browsing arrangement of content accessed by a first computing device of a user in a content browsing session of the content, as between the first computing device and a second computing device of the user in response to a request by the first computing device when interaction of the first computing device with the content becomes involuntarily inhibited, to clone at least a subset of state data comprising only state data flagged as being clonable and created during the content browsing session for use by the second computing device during co-browsing of the content by storing the subset of the state data in the content server in connection with a key, providing the key to the second computing device during the co-browsing session and granting access to the subset of the state data in response to the second computing device providing the key to the content server, to receive a modified form of the subset of the state data from the second computing device resulting from the co-browsing of the content by the second computing device, and to provide the modified form of the subset of the state data to the first computing device for use during the content browsing session.

5. The system of claim 4, wherein the first computing device is a mobile computing device and the second computing device is a personal computer.

6. The system of claim 4, wherein the content is provided by a Web application executing in the content server.

7. A computer program product for of session completion through co-browsing, the computer program product comprising:
   a computer readable storage medium having computer readable program code embodied therewith, wherein the computer readable storage medium is not a transitory signal per se, the computer readable program code comprising:
   computer readable program code for establishing a content browsing session between a first computing device of a user and a content server serving access to content to the first computing device;
   computer readable program code for maintaining state data for the content browsing session by the content server;
   computer readable program code for flagging ones of the state data as being clonable;
   computer readable program code for creating a concurrent co-browsing arrangement of the content as between the first computing device and a second computing device of the user in response to a request by the first computing device when interaction of the first computing device with the content becomes involuntarily inhibited;
   computer readable program code for cloning at least a subset of the state data comprising only state data flagged as being clonable for use by the second computing device during co-browsing of the content by storing the subset of the state data in the content server in connection with a key, providing the key to the second computing device during the co-browsing session and granting access to the subset of the state data in response to the second computing device providing the key to the content server;
   computer readable program code for receiving a modified form of the subset of the state data from the second computing device resulting from the co-browsing of the content by the second computing device; and,
   computer readable program code for providing the modified form of the subset of the state data to the first computing device for use during the content browsing session.

8. The computer program product of claim 7, wherein the first computing device is a mobile computing device and the second computing device is a personal computer.

9. The computer program product of claim 7, wherein the content is provided by a Web application executing in the content server.

* * * * *